Figure 1:
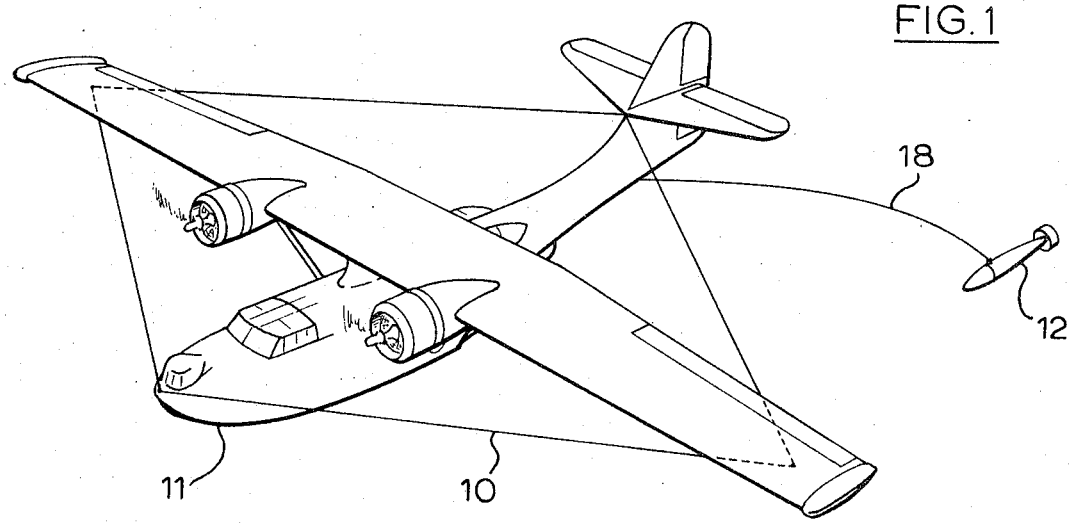

United States Patent [19]

Barringer

[11] 3,852,659
[45] Dec. 3, 1974

[54] GEOPHYSICAL PROSPECTING METHOD AND APPARATUS UTILIZING CORRELATION OF RECEIVED WAVEFORMS WITH STORED REFERENCE WAVEFORMS

[75] Inventor: Anthony Rene Barringer, Willowdale, Ontario, Canada

[73] Assignee: Barringer Research Limited, Ontario, Canada

[22] Filed: Apr. 9, 1973

[21] Appl. No.: 349,629

[30] Foreign Application Priority Data
Apr. 11, 1972 Great Britain.................... 16546/72

[52] U.S. Cl................................ 324/6, 324/3, 324/4
[51] Int. Cl......... G01v 3/10, G01v 3/12, G01v 3/16
[58] Field of Search......... 324/3, 4, 6, 8, 77 J, 77 G

[56] References Cited
UNITED STATES PATENTS

| 2,165,214 | 7/1939 | Blau et al............................ 324/6 X |
|---|---|---|
| 2,929,984 | 3/1960 | Puranen et al...................... 324/4 X |
| 3,014,176 | 12/1961 | McLaughlin et al.................... 324/4 |
| 3,020,471 | 2/1962 | Barringer............................ 324/4 X |
| 3,105,934 | 10/1963 | Barringer............................... 324/4 |
| 3,271,732 | 9/1966 | Anstey et al.................... 324/77 J X |
| 3,321,700 | 5/1967 | Zimmerman........................... 324/8 |
| 3,490,032 | 1/1970 | Zurflueh............................ 324/3 X |
| 3,690,164 | 9/1974 | Gabillard et al.................... 324/6 X |

*Primary Examiner*—Gerard R. Strecker
*Attorney, Agent, or Firm*—Rogers, Bereskin & Parr

[57] ABSTRACT

A primary electromagnetic field having a complex waveform is generated and is radiated toward the earth. Means is provided for receiving electromagnetic signals which are responsive to either the resultant of the primary field and secondary fields emanating from the earth, or else to such secondary fields alone. A plurality of stored reference waveforms corresponding to known geological structures is matched against the received signals, and the optimum match is indicated.

1 Claim, 8 Drawing Figures

PATENTED DEC 3 1974                                    3,852,659

SHEET 1 OF 2

3,852,659

GEOPHYSICAL PROSPECTING METHOD AND APPARATUS UTILIZING CORRELATION OF RECEIVED WAVEFORMS WITH STORED REFERENCE WAVEFORMS

This invention relates to the art of geophysics, and in particular to an airborne and ground mineral exploration method and apparatus.

Many classes of valuable mineral deposits contain sufficient concentration of sulphide ores to make them strongly conductive in comparison to their enclosing rocks. For many years, geophysical systems for detecting these deposits have employed inductive electromagnetic fields generated by transmitting coils carrying alternating currents which induce eddy currents within sub-surface conductive bodies. These eddy currents generate secondary electromagnetic fields which combine with the primary inducing field to produce resultant electromagnetic fields. These resultant electromagnetic fields may be detected with suitable pick-up coils and their phase and magnitude with reference to the primary field can be monitored during continuous traversing, or at a series of pre-determined stations.

The above concept has been embodied in a variety of systems. Simple systems employ a single transmitter frequency and measure the phase and amplitude of secondary fields with respect to the primary transmitted field. More advanced systems employ a plurality of frequencies or pulse wave forms. While these systems can be effective in certain types of terrain, the problems of detecting sub-surface deposits increases substantially when they lie at depths of greater than about 200 feet and when they are covered by conductive overburden. Such overburden may take the form of glacial clay material which s frequently quite conductive due to the ability of clay particles to carry charges. Alternatively, in semi-arid regions overburden may become strongly conductive due to the presence of salts which are leached out to the surface by the combined effects of erratic rainfall and high rates of evaporation. When electromagnetic prospecting systems are used in the presence of conductive overburden, strong eddy currents are induced in the overburden and produce secondary fields which tend to mask the presence of secondary fields arising from underlying mineral deposits. Furthermore, conductive overburden tends to attenuate transmission of electromagnetic fields and reduces the effective depth of penetration of electromagnetic geophysical prospecting systems.

In order to carry out effective prospecting in regions of conductive overburden, it is desirable to employ methods which provide discrimination against the secondary fields generated by conductive overburden and also to improve sensitivity by increasing transmitted power and reducing noise from various sources in the geophysical receiving system.

A highly successful prior system which is directed to the above problem is disclosed in U.S. Pat. No. 3,105,934. This system achieves high sensitivity and discrimination against conductive overburden response. In the above system, high current pulses of several hundred amperes pass through a loop surrounding an aircraft in order to generate powerful electromagnetic pulses. A receiving coil towed in a bird behind the aircraft detects these pulses together with the transient decay of eddy currents which have been induced in the underlying terrain. High sensitivity is achieved by using powerful fields and eliminating noise caused by changes in coupling between the receiving coil towed behind the aircraft and the primary coil, by detecting secondary fields only during the period after the primary pulse has been switched off. Thus the receiving coils are insensitive to the primary field and detect only secondary fields radiated by underlying conductive objects. This time separation allows the use of primary field strengths which are in vicinity of 1,000 times stronger than those typically employed in continuous wave EM systems. However, another important feature of the above system is that transient eddy current response of conductive overburden tends to die out more rapidly than the response from underlying ore body conductors which generally have significantly higher conductivity. Delayed sampling gates are employed to separate out the response from good conductors from those of near surface poor conductors.

The present invention improves discrimination against conductive overburden as well as a variety of noise sources such as thermal noise from the receiving coils, amplifier noise, vibrational noises transmitted through the receiving coil mounting system, and sferic noises from electrical storms. The invention utilizes the fact that when an inductive electromagnetic field having a complex wave form is generated, it will induce eddy currents in conductive objects lying in the vicinity of the field, which will in turn re-radiate secondary electromagnetic fields. These secondary electromagnetic fields will have a waveform which is distorted with respect to the primary field wave form to a degree which is dependent upon the size, shape, conductivity and permeability of the ore body or conductive object. This distortion is due to the fact that a complex waveform contains a large number of frequency components, each one of which is re-radiated (as a result of eddy currents) at different relative amplitudes and phase shifts with respect to the primary waveform. The amplitude and phase shift of the secondary field for each frequency component is determined by the characteristics of the conductive body. In addition, overburden and mineral deposits in general have certain separately identifiable families of responses which can be broadly classified and separately distinguished one from the other.

According to the present invention, a primary field having a complex waveform is generated and is radiated toward the earth. A receiving system is provided which is responsive to either the resultant of the primary and secondary fields, or else to the secondary field alone, as will be explained. Received signals are classified into one or more predetermined families of responses, and advanced signal processing means is used to obtain the best match between the transient response of the received signals (which may be complex) and that of stored reference waveforms which correspond to known geological structures. An advantage of the present invention over that shown in U.S. Pat. No. 3,105,934 is that the entire secondary field may be analyzed if desired, i.e. the field received during the time when the primary field is operative. Also, the present invention provides a high degree of specificity and sensitivity.

Figure 6:
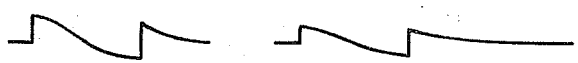
Figure 7:
Figure 8:
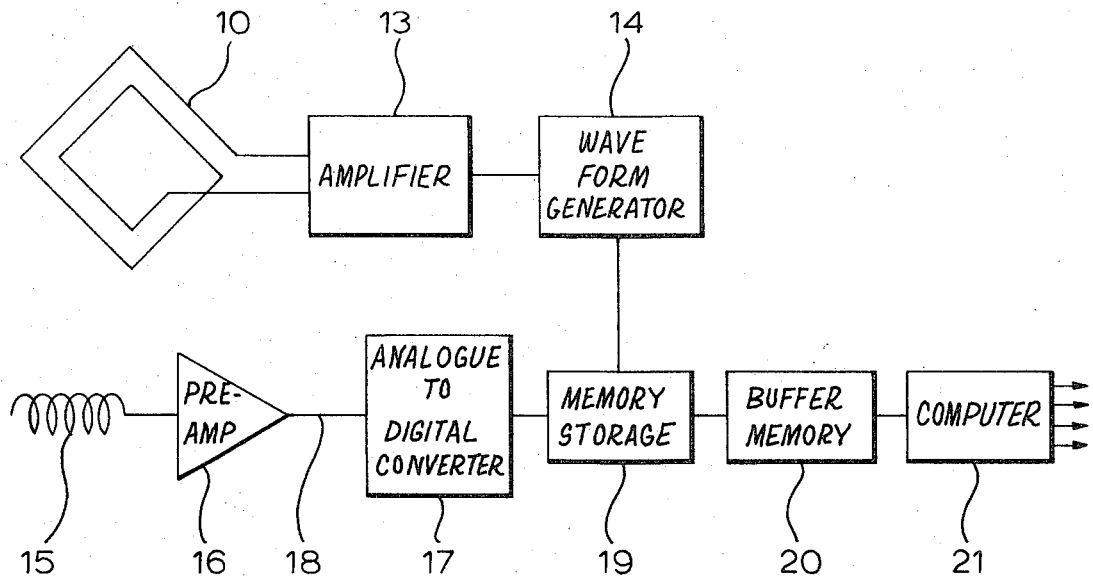

In the drawings,

FIG. 1 is a diagrammatic view of a survey aircraft carrying transmitting and receiving apparatus, FIGS. 2 – 7 are graphical views illustrating various waveforms discussed below, and FIG. 8 is a block diagram of the principal components of a preferred embodiment of the invention.

The invention will be described with reference to the use of a series of half sine current pulses for producing the primary field as such pulses are convenient to generate. It will be understood, however, that the invention can be applied to a variety of waveforms.

Referring to FIG. 1, a primary electromagnetic field is generated by passing current produced by an appropriate generator (not shown) through a multi-turn loop 10, which is installed on an aircraft 11 or other vehicle. The primary field generated by the loop 10 and the secondary fields re-radiated from conductive bodies in the underlying terrain are picked up in a horizontal axis receiving coil towed in a finned, torpedo shaped vehicle known as a bird, which is indicated by reference numeral 12. The receiving coils are connected to a pre-amplifier the output of which is carried to the signal processing equipment in the aircraft on electrical conductors within tow cable 18. This part of the system is similar to that shown in U.S. Pat. No. 3,105,934 referred to above.

Figure 2:
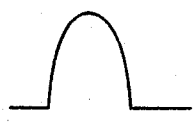
Figures 3, 4:
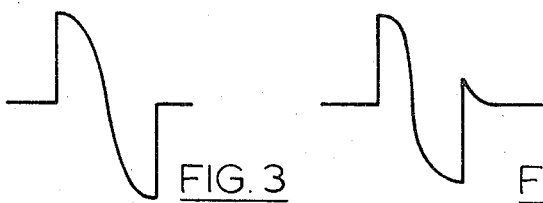

The primary waveform generated by the transmitting loop 10 may be of the half sine pulse type shown in FIG. 2. This pulse is detected by a receiving coil in the form of its half cosine derivitive, since the coil is sensitive to the rate of change of the magnetic flux. The received waveform of the primary pulse is shown in FIG. 3. In the presence of a conductive object such as a subsurface ore body, the received waveform of the secondary field generated by said conductive body is distorted in the fashion shown in FIG. 4. The position of the first zero crossing on the pulse is modified and the pulse is followed by transient decay which is very approximately exponential in shape. A typical response from conductive ore bodies in the transient portion has been found to have a time constant varying between 500 microseconds and 2 milliseconds, said time constant referring to the time required for the transient response to fall to $1/e$ or approximately one-third of its initial amplitude. An appropriate pulse width to adequately energize such a conductive body is of the order of 1–2 milliseconds wide.

Figure 5:

The typical shapes of overburden responses which are stimulated by half sine transmitted pulses are shown in FIG. 5. A similar set of responses from conductive orebodies is shown in FIG. 6. A combined response from a conductive orebody lying beneath conductive overburden is shown in FIG. 7. As will be explained, the correlation filtering system of the present invention is programmed to respond in different channels to a plurality of different overburden and orebody shapes, so that an output will be obtained from the appropriate channel for any one wave form that matches any of the stored shapes. In the case of an orebody lying beneath overburden, an output will be obtained from two channels, one responsive to the overburden shape and the other to the orebody shape.

A block diagram of a preferred embodiment of the invention is shown in FIG. 8. The transmitting loop 10, surrounding the aircraft 11, is connected to a power amplifier 13 which is in turn connected to a wave form generator 14. The power amplifier 13 is designed to be capable of delivering an output power of at least about 1 kilowatt in the transmitting loop 10. A receiving coil 15, which is towed in the bird 12 is critically damped so as to faithfully follow the wave form of the transmitted pulse without ringing, and is connected to a pre-amplifier 16. The output of the pre-amplifier 16 is fed to an analogue to digital converter 17 in the aircraft, via electrical conductors in the tow cable 18.

The analogue to digital converter 17 is connected to a scanning memory storage 19, which synchronously scans the repetative wave form and stores it in a digital buffer memory unit 20. The buffer memory 20 is unloaded at periodic intervals such as twice per second and is digitally cross correlated in a small computer 21, against a family of stored wave forms specific to typical overburden and orebody responses.

The procedure used in the computer 21 provides an optimum fit of the stored reference wave forms against the received wave forms stored in the buffer memory 20. A method which may be used is that of least squares in which each of the stored reference wave forms is subtracted from the received wave form, the amplitude of each reference wave form subtracted from the received wave form being adjusted such that the sum of the squares of all of the ordinates on the residual wave form is at a minimum value. The wave shape corresponding to the primary wave form is subtracted first as this is the largest signal present. Standard procedures well known to one skilled in the art are used in the programming of the computer to obtain the amplitude which gives the least squares minimum. The next reference wave form subtracted is that representing the response of conductive overburden, since this is the signal component which is generally the second largest after the primary field component. Again this is subtracted in such a quantity as will produce a least squares minimum. The same procedure is repeated in turn for each of the stored reference wave forms and at the end of this cycle of operations, the first approximation to a match will have been achieved. It is now necessary to repeat the entire procedure commencing with the primary signal wave form and working through the same sequence. A number of cycles may be required in order to achieve an optimum fit. The test of such an optimum fit is when the least squares residual at the end of each subtraction sequence for a given wave form is not significantly smaller than the least squares residual achieved during the previous iterative cycle. The number of cycles of iteration required is in practice a function of the amount of noise buried in the signal, and the degree of similarity between the signals.

The invention has been described as applied to a pulse type wave form, but in general there is a wide latitude in the type of primary wave forms that may be used. It is required that the wave form of the primary field be (a) known, (b) time varying, and (c) it should contain a sufficient number and range of frequency components to enable the orebody to be identified. In an airborne system, frequencies of 100 to 10,000 Hz are approximately practical limits, but in a ground system lower frequencies as well might advantageously be used.

The invention has been described as being applied to the entire received wave form. It is possible however when using a pulse type primary field to utilize only the transient portion of the received signal immediately following a primary pulse. This eliminates the very large primary wave form and makes the task of achieving a match against the received wave form with the reference wave forms somewhat less critical. This expedient however reduces signal to noise ratios since the portion of the secondary field that is obscured by the primary wave form is no longer utilized. The pulse wave forms that may be employed when using the transient section of the received wave form include half sine pulses, saw tooth and ramp pulses, and any other form of pulse in which the main signal is followed abruptly by a period in which the current in the transmitting loop is either zero, a steady current, or has a constant rate of change. In either of these cases the differentiated wave form detected in the receiving coil has zero rate of change in the period which is utilized for detecting secondary field transients.

Whereas the receiving means utilized in the invention has been described as a critically damped receiving coil, it will be appreciated that a magnetometer of sufficiently high sensitivity may be employed as an alternative. The majority of magnetometers are not sufficiently sensitive for this application, but as the state of the art advances new magnetometers are being developed which are achieving sensitivities in the vicinity of $10^{-9}$ gauss, and better.

The use of a single horizontal axis receiving coil has been described above. However, there are some advantages to employing two or three orthogonal receiving coils as shown in U.S. Pat. No. 3,105,934 in order to provide additional information on the geometry of the conductive body being detected. Thus a vertical conductive sheet can be more easily differentiated from a dipping sheet using a vertical and a horizontal axis receiving coil and comparing the two outputs in the computer against pairs of stored signatures.

It is also possible to use a horizontal axis transmitting coil instead of a vertical axis coil as illustrated in FIG. 1. Such a coil can be wound in solenoid form and carried on the wing tip or under the fuselage of a plane.

The invention has been described as embodying a digital computer as part of the receiver, and it will be appreciated that this computer can be placed either directly in the aircraft in order to carry out real time computations on the signal or it can be placed on the ground. In the latter case, the received signal can either be telemetered by radio link to a ground station where the processing may be carried out, or can be tape recorded on board the aircraft for subsequent analysis. A convenient method of tape recording is to employ a scanning and synchronously integrated buffer storage which accumulates and averages return signals over periods of one-half second and then dumps the stored signal onto a digital magnetic tape recorder. This reduces the quantity of tape required and provides an output of wide dynamic range that is ready for processing on the ground using the system that has been described. However, it is quite acceptable to record the raw signal using FM tape modulation techniques as opposed to the aforementioned digital integration methods.

The foregoing description has referred to the use of aircraft, but it will be understood that the invention is equally applicable to ground systems in which the transmitting loop is carried on a ground vehicle or laid on the ground. Once again the analysis of the received signal can be carried out in real time or can be telemetered or tape recorded for processing at a central station.

In the usual airborne application of the invention parallel traverses are flown at an altitude typically in the vicinity of 400 feet with intervals in the vicinity of 1,000 feet between traverses. Profile maps are produced of the amplitudes of the various outputs plotted in graphical form along flight line paths. The procedures used in data plotting are well known in the art of airborne geophysical surveying.

Although the invention has been described with reference to a digital computer, it will be understood that analogue processing techniques could be used instead. Digital processing is however more flexible in terms of the types of reference wave forms that can be stored and in the mathematical analysis techniques that can be used.

With regard to the generation of reference wave forms for matching purposes, it is possible to correlate the received signal against a series of wave forms representing the responses of single loops of wire, or in other words, single current loops each having a differing time constant. The time constant of the loop of thin wire of given dimensions will be short compared with the same sized loop constructed of thick wire. The transient response of these loops of wire are represented by L/R where L equals the inductance and R equals the resistance. The transient response of a single loop is a perfect exponent and it has been found that as an approximation, the response of conductive overburden and of conductive orebodies is similar to that of a single loop of wire. When this is examined in detail, however, it is noted that there are departures in the transient response of natural conductors from the pure exponential case. It has been found possible to synthesize the transient responses of natural conductors by summing a series of pure exponential responses. Short time constants of less than 500 microseconds match fairly well against overburden and longer ones between 500 microseconds and 3 milliseconds match against orebody responses. A suitable family of reference wave forms would be a set of responses from wire loops having time constants of 100 microseconds, 200 microseconds, 400 microseconds, 800 microseconds, 1,600 microseconds, and 3,200 microseconds.

Whereas the use of the reference wave forms similar to those generated by simple wire loops is adequate to produce an operational system, superior results are obtained by employing reference wave forms which are a closer match in shape against overburden and orebody responses. Thus, in the preferred embodiment of the invention, the same family of time constants as above is used for reference wave forms, namely 100, 200, 400, 800, 1,600, and 3,200 microseconds. However, the wave forms are modified to represent the responses of flat conductive sheets in the case of the 100 microsecond, 200 microsecond, and 400 microsecond responses and conductive spheres for the 800 microsecond, 1,600 microsecond, and 3,200 microsecond responses. These shapes which approach hyperbolic in form correspond much more closely to the response of conductive overburden and orebodies respectively and in effect provide narrower band filtering of the received signal. Using this approach, a cleaner separation is possible between the signals attributable to conductive overburden and signals attributable to underlying orebodies of higher conductivity.

Although the invention has been described above with reference to the correlation of received wave forms with reference wave forms, it will be understood that the received wave forms could be modified to produce wave forms which are mathematically related to the received wave forms, and the correlation would then be made with such mathematically related wave forms and reference signals which directly or indirectly represent known earth conditions. This may be an advantage in facilitating some computer procedures. In addition, although the reference wave forms could be determined mathematically by computing the wave forms that would result from certain assumed physical structure (such as flat horizontal layers, spheres, etc.), it will be understood that the reference wave forms might also be obtained by actual measurement over known terrain. For example, in an area where there is a layer of conductive earth overlying nonconductive rock, the wave form attributable to the conductive layer could be obtained by actual measurement, and this measurement utilized as a reference.

What I claim is:

1. Geophysical prospecting apparatus comprising:
   a. means for generating a primary electromagnetic field and coupling said primary field with an area of the earth, said primary field being defined by a pre-determined, periodic, time varying waveform containing a plurality of frequency components sufficient to permit the identification of mineral deposits which may be located in said area, said primary field causing eddy currents to be induced in conductive deposits present in said area which are intersected by said primary field, which eddy currents result in the formation of secondary electromagnetic fields,
   b. means for receiving electromagnetic signals emanating from the earth which are responsive in phase and amplitude to said secondary electromagnetic fields, said electromagnetic signals being received in the presence of said primary field and during intervals when said primary field is not time varying,
   c. means for storing a plurality of reference waveforms which respectively are related in a pre-determined manner to a plurality of different pre-determined geophysical conditions, said reference waveforms comprising mathematically derived functions representing geophysical conductors of a plurality of time constants and being selected from the group consisting of (a) a conductive loop, (b) a conductive sheet and (c) a conductive sphere, and
   d. means for correlating said received electromagnetic signals with said stored reference waveforms and for indicating the particular reference waveform which provides an optimum match therewith.

* * * * *